United States Patent
Geiser et al.

(10) Patent No.: US 9,557,433 B2
(45) Date of Patent: Jan. 31, 2017

(54) FRACTURE IMAGING METHODS EMPLOYING SKELETONIZATION OF SEISMIC EMISSION TOMOGRAPHY DATA

(75) Inventors: Peter Anderson Geiser, Boulder, CO (US); Jan Meredith Vermilye, Lyons, CO (US)

(73) Assignee: Seismic Global Ambient, LLC, Missouri City, TX (US)

( * ) Notice: Subject to any disclaimer, the term of this patent is extended or adjusted under 35 U.S.C. 154(b) by 348 days.

(21) Appl. No.: 13/070,442

(22) Filed: Mar. 23, 2011

(65) Prior Publication Data
US 2012/0243368 A1   Sep. 27, 2012

(51) Int. Cl.
*G01V 1/06* (2006.01)
*G01V 1/42* (2006.01)
*G01V 1/28* (2006.01)

(52) U.S. Cl.
CPC ............... *G01V 1/42* (2013.01); *G01V 1/288* (2013.01)

(58) Field of Classification Search
USPC ........................................................ 367/9
See application file for complete search history.

(56) References Cited

U.S. PATENT DOCUMENTS

| 5,390,291 | A | 2/1995 | Ohashi |
| 5,884,229 | A | 3/1999 | Matteucci |
| 6,389,361 | B1 | 5/2002 | Geiser |
| 6,516,274 | B2 | 2/2003 | Cheng et al. |
| 6,985,816 | B2 | 1/2006 | Sorrells et al. |
| 7,069,149 | B2 | 6/2006 | Goff et al. |
| 7,127,353 | B2 | 10/2006 | Geiser |
| 7,391,675 | B2 | 6/2008 | Drew |
| 7,660,199 | B2 | 2/2010 | Drew |
| 7,663,970 | B2 | 2/2010 | Duncan et al. |
| 2003/0112704 | A1* | 6/2003 | Goff et al. ................ 367/72 |
| 2004/0014212 | A1* | 1/2004 | Elliott et al. ............. 435/373 |

(Continued)

FOREIGN PATENT DOCUMENTS

WO   WO 2011005353 A1 *   1/2011

OTHER PUBLICATIONS

Directional 3D Thinning Using 8 Subiterations Kálmán Palágyi and Attila Kuba. DGCI'99, LNCS 1568, 325-336 (1999).

(Continued)

*Primary Examiner* — James Hulka
(74) *Attorney, Agent, or Firm* — Edward Eugene Thigpen

(57) ABSTRACT

Disclosed herein are various embodiments of methods and systems for providing a graphical skeletonization representation of fractures and faults in a subsurface of the earth. According to some embodiments, as fracturing fluid is pumped into a target geologic formation through a well bore, and as the formation fractures or faults in response to the fracturing fluid being pumped under high pressure therein, seismic wavefronts are generated at points of fracture related to movement of a fluid pressure wave induced by fracturing or other fluids moving through the formation, or the extraction of fluids such as gas and/or oil from the formation, which are detected by surface and/or downhole sensors. Data corresponding to signals generated by the surface and/or downhole sensors are recorded and subsequently analyzed to determine in near real-time the locations of the fractures or faults using skeletonization data processing techniques and methods.

19 Claims, 8 Drawing Sheets

(56) References Cited

U.S. PATENT DOCUMENTS

| | | | |
|---|---|---|---|
| 2004/0151356 A1* | 8/2004 | Li et al. | 382/131 |
| 2008/0043024 A1* | 2/2008 | Schiwietz et al. | 345/442 |
| 2009/0076388 A1* | 3/2009 | Napoli et al. | 600/437 |
| 2009/0122061 A1* | 5/2009 | Hammon, III | 345/424 |
| 2010/0149917 A1 | 6/2010 | Imhof et al. | |
| 2010/0161232 A1 | 6/2010 | Chen et al. | |
| 2011/0002194 A1* | 1/2011 | Imhof et al. | 367/53 |
| 2011/0048731 A1* | 3/2011 | Imhof et al. | 166/369 |
| 2012/0090834 A1* | 4/2012 | Imhof et al. | 166/250.01 |
| 2013/0128693 A1* | 5/2013 | Geiser | 367/27 |
| 2013/0201787 A1* | 8/2013 | Vermilye et al. | 367/9 |
| 2013/0215712 A1* | 8/2013 | Geiser et al. | 367/9 |

OTHER PUBLICATIONS

Direct Mapping of Reservoir Permeability Fields Peter Geiser, Jan Vermilye, Rob Scammell and Steve Roecker, Oil & Gas Journal, Dec. 2006.

The process zone: A microstructural view of fault growth Jan M. Vermilye and Christopher H. Scholz Journal of Geophysical Research, 1998, vol. 103, No. 56, pp. 12,223-12,237.

A Continuous Skeletonization Method Based on Level Sets Martin Rumpf, Afexandru Telea Joint EUROGRAPHICS—IEEE TCVG Symposium on Visualization (2002).

Marching Cubes: A high resolution 3D surface construction algorithm Wiliam E. Lorensen, Harvey E, Cline Siggraph 87 Proceedings, ser Computer Graphics, vol. 21, Nr. 4, 163-170 Jul. 1987.

Seismic Skeletonization: A Useful Tool for Data Analysis K. Vasudevan, F.A. Cook and D.W. Eaton, CSEG Recorder, Nov. 2006, 37-42.

An iterative approach to seismic skeletonization Shin-yee Lu and Yoa-chou Cheng, Geophysics, vol. 55, 1312-1320 (1990).

\* cited by examiner

FRACTURE IMAGING METHODS EMPLOYING SKELETONIZATION OF SEISMIC EMISSION TOMOGRAPHY DATA

FIELD

Various embodiments described herein relate to the field of seismic data acquisition and processing, and devices, systems and methods associated therewith.

BACKGROUND

For the first 100 years and more of oil exploration and production, wells were drilled almost exclusively in geologic formations that permitted production of oil and gas flowing under the natural pressures associated with the formations. Such production required that two physical properties of the geologic formation fall within certain boundaries. The porosity of the formation had to be sufficient to allow a substantial reserve of hydrocarbons to occupy the interstices of the formation, and the permeability of the formation had to be sufficiently high that the hydrocarbons could move from a region of high pressure to a region of lower pressure, such as when hydrocarbons are extracted from a formation. Typical geologic formations having such properties include sandstones.

In recent years, it has become apparent that large reserves of hydrocarbons are to be found in shale formations. Shale formations are typically not highly permeable, and therefore present formidable obstacles to production. The most common technique in use today that permits economic production of hydrocarbons, and especially natural gas from shale formations, is hydraulic fracturing (often referred to as "fracking"). This technique can be also be applied to older wells drilled through non-shale formations to increase the proportion of hydrocarbons that can be extracted from them, thus prolonging well life.

Fracking involves pumping fluid under very high pressure into hydrocarbon-bearing rock formations to force open cracks and fissures and allow the hydrocarbons residing therein to flow more freely. Usually the fluids injected into such formations contain chemicals to improve flow, and also contain "proppants" (an industry term for substances such as sand). When the fracturing fluid is removed, and the hydrocarbons are allowed to flow, the sand grains prop open the fractures and prevent their collapse, which might otherwise quickly stop or reduce the flow of hydrocarbons.

Drilling technology has evolved to allow wells to be drilled along virtually any direction or azimuth, and is no longer constrained to the drilling of vertical wells only. Deviated wells are thus often drilled along specific geologic formations to increase production potential. The extent of a hydrocarbon-producing formation in a vertical well may be measured in feet, or perhaps tens or hundreds of feet in highly productive areas. The maximum area of the formation in contact with the vertical well bore is quickly computed as the circumference of the well multiplied by the height of the producing formation. In practice, the producing area is much less than this figure. By drilling horizontally or non-vertically through a formation, the extent of the formation in contact with the wellbore can be much greater than is possible with vertically-drilled wells. Injecting deviated wells with hydraulic fracturing fluid can result in the propagation of fractures outwardly from the wellbore, and thereby increase significantly the total volume of the subsurface from which the hydrocarbons can be extracted.

The progress of a fracturing operation must be monitored carefully. Well fracturing is expensive, and the fracturing process is frequently halted once its benefits become marginal. The high pressures associated with fracturing result in fractures that tend to follow existing faults and fractures, and can result in an uneven or unpredictable fracture zone. Fracturing fluid may also begin following an existing fault or fracture zone and then propagate beyond the intended fracture zone. Care must also be taken not to interfere with existing production wells in the area. For these and other reasons, it is important that the fracturing operator be permitted to follow accurately the progress of the fluid front in the subsurface while the fluid is being injected into the well.

Conventional surface seismic reflection surveys generally do not work well for monitoring the movement or positions of fluid fronts in the subsurface. The physical dimensions of fractures are often shorter than can be detected using conventional surface seismic reflection techniques. In addition, within a given formation there may be no or low contrasts in seismic velocity, and as a result surface seismic reflection techniques cannot be used effectively to image fractures within the formation. Fractures also tend to scatter seismic energy, further obscuring their detection by conventional surface seismic reflection means.

An alternative approach to the problem of imaging factures or fluid fronts within formations known as "microseismicity" has its origins in earthquake seismology and in technology developed to monitor nuclear tests. Instead of using "active" surface seismic energy sources, "passive seismic" techniques are used to detect seismic energy generated in the subsurface of the earth. Seismic energy emitted by fracturing a geologic formation, which is caused by the injection of high pressure fracturing fluid into the formation, is sensed and recorded. The objective then becomes determining the point of origin of the emitted seismic energy, which defines the location of the fracture.

One method of locating fractures and faults in geologic formations is known as Seismic Emission Tomography (SET). Examples of SET techniques and processes are described in U.S. Pat. No. 6,389,361 to Geiser entitled "Method for 4D permeability analysis of geologic fluid reservoirs" (hereafter "the '361 patent") and in U.S. Pat. No. 7,127,353 to Geiser entitled "Method and apparatus for imaging permeability pathways of geologic fluid reservoirs using seismic emission tomography" (hereafter "the '353 patent"), the disclosures of which are hereby incorporated by reference herein in their respective entireties.

The SET process entails recording microseismic data using an array of sensors, which are typically located on the surface of the earth. Data are recorded over a given time period, with the duration of recording and the sampling interval being controlled by the objectives of the seismic data acquisition process, the characteristics of the events that generate the detected or sensed seismic energy, the distances involved, the characteristics of the subsurface, and other factors. The data recorded at each sensor location are then filtered and processed using SET processing techniques and software, which convert the data into a series of gridded subsurface volumes corresponding to multiple time samples. The values of the points in the grid represent given attributes of the data, which values vary over time as the energy emitted at each point in the subsurface varies.

What is required for effective monitoring of a fracturing operation is the ability to generate a near-real-time display of a predetermined attribute or characteristic of microseismic data, or a set of predetermined attributes or characteristics of microseismic data, that is capable of indicating the points of origin of microseismic energy in the subsurface, and the growth of a fracture network over time.

SUMMARY

In one embodiment, there is provided a method of imaging one of a fracture and a fault in an earth volume disposed beneath a surface of the earth using a microseismic seismic emission tomography (SET) data set acquired over a data acquisition time period using a plurality of sensors located at a plurality of sensor positions disposed proximate the earth volume, where the method comprises selecting a skeletonization time period within the data acquisition time period, sub-dividing the skeletonization time period into a series of time windows using a time increment, generating an input data set corresponding to the skeletonization time period, the input data set comprising a plurality of data subsets, each data subset corresponding to a given time window, transforming the input data set into a plurality of SET spatial volumes, each SET spatial volume being associated with a given data subset and having a plurality of voxels associated therewith, voxel value filtering each data subset to generate filtered voxel values associated therewith, after voxel value filtering, stacking at least selected ones of the filtered voxel values to generate stacked filtered voxel values, and skeletonizing the stacked filtered voxel values to generate a three-dimensional spatial representation of the fracture or fault.

In another embodiment, there is provided a method of imaging one of a fracture and a fault in an earth volume disposed beneath a surface of the earth using a microseismic seismic emission tomography (SET) data set acquired over a data acquisition time period using a plurality of sensors located at a plurality of sensor positions disposed proximate the volume, where the method comprises selecting a skeletonization time period within the data acquisition time period, sub-dividing the skeletonization time period into a series of time windows using a time increment, generating an input data set corresponding to the skeletonization time period, the input data set comprising a plurality of data subsets, each data subset corresponding to a given time window, transforming the input data set into a plurality of SET spatial volumes, each SET spatial volume being associated with a given data subset and having a plurality of voxels associated therewith, stacking at least selected ones of the voxel values to generate stacked voxel values, after stacking, voxel value filtering the stacked voxel values to generate filtered stacked voxel values associated therewith, and skeletonizing the filtered stacked voxel values to generate a three-dimensional spatial representation of the fracture or fault.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTIONS OF SOME EMBODIMENTS

Figure 1:
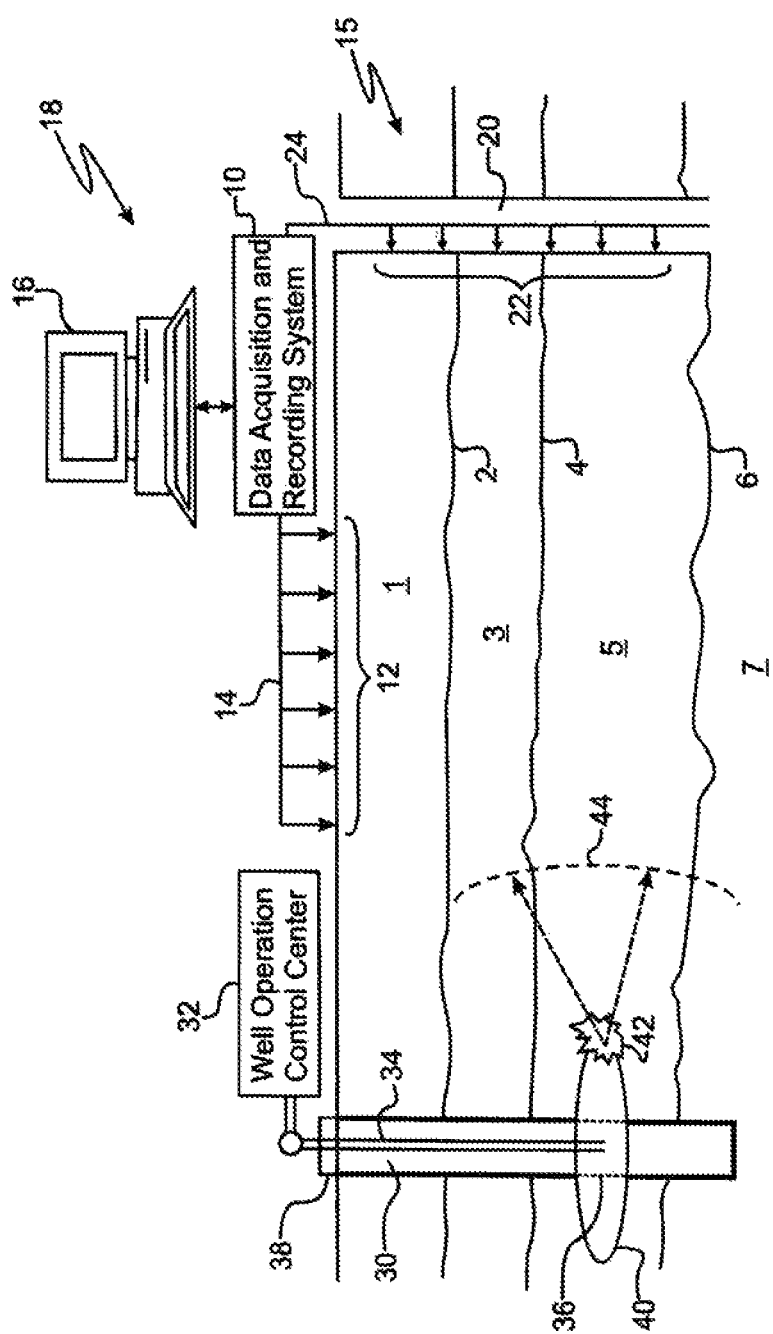
FIG. 1 shows one embodiment of a cross-sectional view of the earth and corresponding data acquisition, recording and analysis system 18.

In the following description, specific details are provided to impart a thorough understanding of the various embodiments of the invention. Upon having read and understood the specification, claims and drawings hereof, however, those skilled in the art will understand that some embodiments of the invention may be practiced without hewing to some of the specific details set forth herein. Moreover, to avoid obscuring the invention, some well known methods, processes and devices and systems finding application in the various embodiments described herein are not disclosed in detail.

In the drawings, some, but not all, possible embodiments are illustrated, and further may not be shown to scale.

FIG. 1. shows a cross-sectional view of the earth in the vicinity of well bores 20 and 30, where hydraulic fracturing fluid is injected into well bore 30 and then into geologic formation 5, and seismic wavefronts and energy 44 emitted at point of fracture 42 caused by the fracturing of geologic formation 5 by the fracturing fluid are sensed by surface sensors 12 disposed along surface 8 and/or downhole sensors 22 disposed in well bore 20. The electrical, magnetic, or optical analog or digital signals generated by sensors 12 and 22 in response to sensing seismic energy or wavefront 44 are representative of the detected or sensed seismic energy, and are recorded as data by acquisition and recording system 10. As further shown in FIG. 1, data acquisition, processing and interpretation/analysis system 18 comprises surface sensors 12 and downhole sensors 22 operably connected to data acquisition and recording system 10, and data processing computer 16 operably connected to data acquisition and recording system 10. Note that FIG. 1 shows only one of many possible embodiments of system 18 for acquiring, processing and interpreting/analyzing microseismic data in a well setting.

In FIG. 1, a fracturing operation is shown in progress in wellbore 30. Under the control and direction of well operation control center 32, hydraulic fracturing fluid is pumped into wellbore 30 at high pressure through pipe 34. The high pressure of the pumping operation forces fracturing fluid out of the wellbore 30 and through perforations 36 in wellbore 30 into hydrocarbon producing geologic formation 5. As the fracturing fluid flows outwardly from wellbore 30 and into geologic formation 5, the high pressure of the fluid fractures surrounding formation 5, causing one or more releases of seismic energy at point of fracture 42. This seismic energy propagates through subsurface 15 of the earth as a series of acoustic wavefronts or seismic waves 44, which are then sensed by surface sensors 12 and downhole sensors 22, converted into electrical, optical and/or magnetic analog or digital signals, and recorded by data acquisition and recording system 10 using techniques and equipment well known in the art. In data acquisition, processing and interpretation system 18 of FIG. 1, and according to one embodiment, data may be recorded, processed and analyzed or interpreted while fracturing is occurring, thereby permitting near-real-time monitoring of the fracturing process.

Data acquisition and processing configurations other than that shown in FIG. 1 may be employed. For example, only surface sensors 12 may be employed or only downhole sensors 22 may be employed, and downhole sensors may be employed in well bore 30 in addition to or instead of in well bore 20. Seismic sensors 12 and 22 may be deployed along surface 8 and in well bore 20 and/or well bore 30. Any suitable combination of surface sensors 12 and/or downhole sensors 22 may be employed. By way of example, sensors 12 and 22 may be geophones, accelerometers, piezoelectric sensors, hydrophones, or any other suitable acoustic sensor. One-, two- or three-axis geophones may also be used in sensors 12 on surface 8 or in sensors 22 in well bores 20 and/or 30. Sensors 22 may be cemented in place permanently in well bore 20 or well bore 30, and thereafter used to acquire data for multiple projects. Sensors 22 may also be lowered into well bore 20 on wireline or cable 24. The electrical, magnetic or optical signals from sensors 22 are then transmitted to the data acquisition and recording system 10 along through wireline or cable 24. Note further that system 18 may be employed in land, marine, off-shore rig, and transition zone settings. In addition, multiple data processing computers 16 may be employed, and/or multiple data acquisition and recording systems 10 may be employed.

Continuing to refer to FIG. 1, seismic energy 44 originating in geologic formation 5 as a result of fracturing caused by the injection of fracturing fluid into formation 5 propagates within a volume of subsurface 15 of the earth through geologic formations 1, 3, 5, and 7, and is received at a plurality of surface and/or downhole sensor locations corresponding to sensors 12 and/or 22 located proximate a volume of subsurface 15 of the earth. Each of sensors 12 or 22 may comprise one or a plurality of sensors, or arrays of sensors, and are typically geophones, although accelerometers and other types of electrical, magnetic and optical sensors may also be used. Note further that sensors 12 and/or 22 may be 1-, 2- or 3-mutually-othogonal axis sensors, geophones, hydrophones or accelerometers configured to generate electrical, magnetic and/or optical signals proportional to the displacement, velocity or acceleration of the earth at locations corresponding to sensors 12 and 22, where such displacement, velocity or acceleration is caused by seismic wavefront 44 arriving at the locations of sensors 12 and/or 22. The electrical, magnetic or optical signals generated by sensors 12 and/or 22 are transmitted to data acquisition and recording system 10 by cable 14 and wireline or cable 24.

In other embodiments, signals generated by sensors 12 and/or 22 are transmitted by wireless transmitters to a receiver operably connected to data acquisition and recording system 10. In still other embodiments, the electrical, magnetic and/or optical signals generated by sensors 12 and/or 22 are stored as data in solid state or other memory or recording devices associated with one or more sensors 12 and/or 22. The memories or recording media associated with the recording devices may be periodically collected or polled, and the data stored therein uploaded to data acquisition and recording system 10.

Other embodiments include but are not limited to, the recording of seismic waves created by the energy released by explosive charges during the perforation of wellbore 30. When wellbore 30 is cased with a metal pipe or casing, the casing must be perforated so that oil or gas may flow into pipe 34 and thence to the surface of the earth at wellhead 38. Small explosive charges are used to perforate the casing and create perforations 36 through which oil or gas may then flow. Yet further embodiments include, but are not limited to, the recording of seismic waves created by the energy released by explosive charges placed at the very bottom or "toe" of a well, or by a "string shot" (generated by a cord-like length of explosive material placed within the well), both of which techniques are typically carried out for the purpose of developing a seismic velocity depth profile of the well.

Still other configurations and embodiments may be employed to locate, measure and analyze faults in the subsurface of the earth by microseismic detection and processing means, such as, for example, sensing, recording and analyzing seismic energy originating from naturally occurring events, such as slippage along faults, settling or tilting of the subsurface, earthquakes, and other naturally-occurring events.

Data recorded by data acquisition and recording system 10 is typically, although not necessarily, in the form of digitally sampled time series referred to as seismic traces, with one time series or seismic trace for each sensor 12 or 22. Each value in the time series is recorded at a known time and represents the value of the seismic energy sensed by sensors 12 and 22 at that time. The data are recorded over a period of time referred to as the data acquisition time period. The data acquisition time period varies depending on the objective of the seismic survey. When the objective of the survey is to monitor a fracturing operation, for example, the data acquisition time period may be in hours or even days. When the objective of the survey is to acquire data associated with perforating a well, the data acquisition time period is much shorter and may be measured, by way of example, in seconds or minutes.

The rate at which data are recorded for each of the channels corresponding to each of the sensors 12 and 22 may also be varied in accordance with the objectives of the survey, and the frequencies characteristic of the seismic energy generated at point of fracture 42, and seismic wavefront 44 as it propagates through subsurface 15 and to surface 8. For example, if frequencies less than or equal to 125 Hz are expected to be sensed or measured in acoustic wavefront 44, data may be sampled at a rate of 2.0 milliseconds ("ms") per channel to ensure aliasing does not occur. Other sample rates are also possible such as 0.25 ms, 0.5 ms, 1 ms, 4 ms, 8 ms, 16 ms, and so on.

It is usual to record more data than is required for a given survey objective. For example, when monitoring a fracturing operation, recording may begin several minutes before the fracturing operation is scheduled and continue until a time beyond which it is unlikely that any further energy will be released as a result of the fracturing process. Such a process may be used to record the ambient seismic field before and/or after fracturing, production, halt of production, or perforation operations, more about which is said below. To restrict the data processing to cover only a time of interest, a skeletonization time period is selected from within the data acquisition time period, and only data recorded within the skeletonization time period are processed.

Once the seismic data have been recorded, they must be processed and converted to produce a useful display of information. Examples of providing such displays of information may be found in the above-referenced '361 and '353 patents, where some SET data acquisition and processing techniques are described in detail.

In at least some SET techniques and processes, the subsurface of the earth is subdivided into a 3D grid, and the cells in the grid are referred to as 'voxels'. A 'voxel' or 'volume element' is the 3D equivalent of a 2D 'pixel' or 'picture element'. While various different algorithms may be used to transform the acquired data, the end result is typically the same: a series of SET spatial volumes are produced, where each SET spatial volume is associated with a given data subset, and each data subset corresponds to a given time window. The values corresponding to the voxels within the spatial volume represent the amount of energy emitted from each voxel during a given time window.

The energy emitted from each voxel during a given time window may be represented by different attributes of the data, including, but not limited to, semblance, amplitude, absolute amplitude, reflection strength (the amplitude of the envelope of the seismic wave), phase, frequency, and other attributes of seismic data which will be apparent to those skilled in the art. According to one embodiment, more about which is said below, voxel values are computed on the basis of semblance values.

In one embodiment, the voxel values within SET spatial volumes are filtered. In such a context, "filtering" or "voxel filtering" means sorting, restricting or limiting the voxel values which are employed in subsequent steps, and may not mean changing the value of any voxel by applying filters to individual data values. In such an embodiment, the objective is to improve the final result by only including data values corresponding to releases of seismic energy from a fault or fracture, while eliminating data values that are likely to correspond to random noise spikes or low level background noise. There are many ways of selecting voxel value limits or "voxel filtering," and the embodiments set forth herein for doing so are merely provided as examples of some techniques that may be used. It is to be understood, however, that other "voxel filtering" techniques may be used, including techniques where individual voxel values are filtered, or where voxel values are smoothed, averaged, median-filtered, and the like.

With respect to the flow charts and methods set forth in FIGS. 2, 3, 4 and 5 discussed in greater detail below, and for the purpose of providing clarification we now provide further information and explanation concerning the meanings of some of the terms appearing in these Figures.

Data acquisition time period means the period of time ranging, by way of example, from about one minute to about one week or more during which time period microseismic data are recorded. The data acquisition time period is selected to be longer than, and to encompass within it, the time period over which fracturing or other events of interest occur.

Skeletonization time period means a subset of the data acquisition time period, and is selected in accordance with data processing parameters and objectives specific to the particular task at hand (e.g., determining and displaying as a function of time points of fracture origin corresponding to a fracking operation). By way of example, the skeletonization time period may range between one minute and several hours (e.g., the time period of interest over which the fracturing or other events of interest take place).

The time window is a subset of the skeletonization time period, and defines a length of time over which data are processed to generate a single SET spatial volume, which by way of example may range between about 0.1 seconds and several minutes. In one embodiment, the skeletonization time period is subdivided into a plurality of time windows of equal length, and the time increment for the start time of each time window may be selected to be less than or equal to the time window length, thereby causing adjacent time windows to overlap. In another embodiment, such time windows do not overlap. Processing microseismic data falling within the skeletonization time period using SET data processing techniques results in a plurality of SET spatial volumes, where each SET spatial volume represents a given time window, and where the plurality of SET spatial volumes represents a series of concatenated or sequentially arranged time windows.

The time interval is a subset of the skeletonization time period comprising a plurality of time windows. Data from each time interval is filtered and stacked, or stacked and filtered, as the case may be, and as further described below, to create a skeletonized output spatial volume that shows the fractures as they existed at the time corresponding to each time interval. Displaying the skeletonized output spatial volumes from consecutive time intervals illustrates the growth of the fractures with time over the entire skeletonization time period. By way of example, each time interval may range between about 1 second and several hours.

A time lapse file is a file stored in the data acquisition, recording and analysis system 18 shown in FIG. 1, or stored in another computer-readable medium such as a hard drive, optical drive, flash drive or the like, where the values of each such file represent filtered voxel values corresponding to a given time window within a given time interval.

A time interval file is a file stored in the data acquisition, recording and analysis system 18 shown in FIG. 1, or stored in another computer-readable medium such as a hard drive, optical drive, flash drive or the like, where the values of each such file represent stacked voxel values corresponding to a given time interval.

"Skelfile" is shorthand for "skeletonized file," or a file containing the skeletonized results for a single time interval showing a composite of the fractures or faults that have been detected over the time interval corresponding thereto.

"Time sequence skelfile" is a file containing the skeletonized results for all time intervals, which file is output only when the skeletonization time period has been subdivided into a plurality of time intervals, and which shows the growth of the detected fractures or faults over time.

Figure 2:
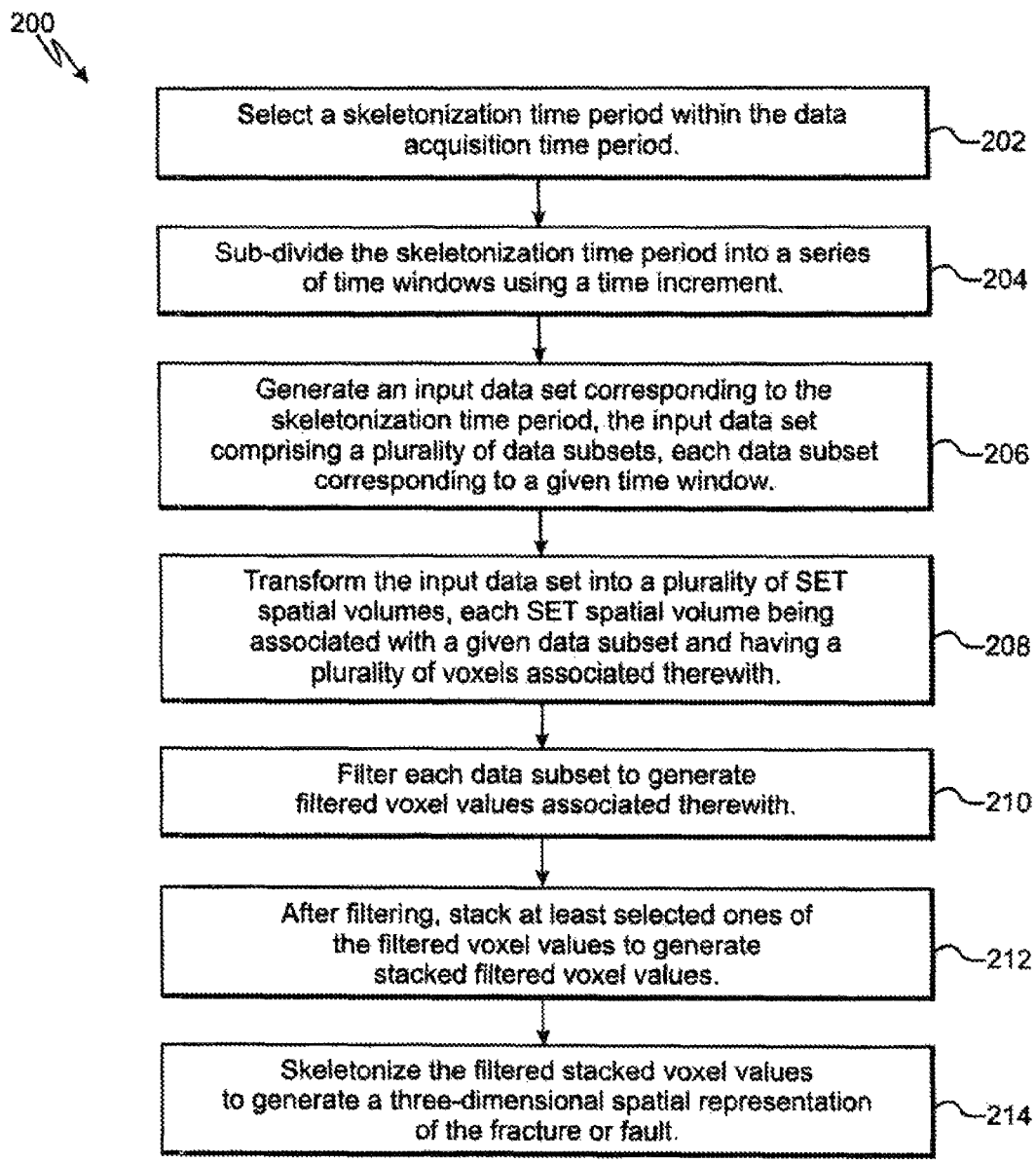
FIG. 2 shows one embodiment of a method 200 of processing microseismic data.

Referring now to FIG. 2, there is shown one embodiment of a method 200 for imaging one of a fracture and a fault in an earth volume disposed beneath a surface of the earth using a microseismic seismic emission tomography (SET) data set acquired over a data acquisition time period using a plurality of sensors located at a plurality of sensor positions disposed proximate the earth volume. As shown in FIG. 2, at step 202 a skeletonization time period within the data acquisition time period is selected. At step 204 the skeletonization time period is sub-divided into a series of time windows using a time increment. At step 206 an input data set corresponding to the skeletonization time period is generated, where the input data set comprises a plurality of data subsets, each data subset corresponding to a given time window. At step 208 the input data set is transformed into a plurality of SET spatial volumes, where each SET spatial volume is associated with a given data subset and has a plurality of voxels associated therewith. Next, at step 210 each data subset is voxel value filtered to generate filtered voxel values associated therewith, and at step 212, after voxel value filtering, at least selected ones of the filtered voxel values are stacked to generate stacked filtered voxel values. Finally, at step 214 the stacked filtered voxel values are skeletonized to generate a three-dimensional spatial representation of the fracture or fault. Note that according to one embodiment semblance filtering techniques may be applied at step 210, and further that the order of some of the steps shown in FIG. 2 may be changed as those skilled in the art will understand.

Some additional steps that may be included in some embodiments of method 200 of FIG. 2 include one or more of: (a) voxel value filtering further comprising computing at least one local maximum in the voxels of the data subset; (b) voxel value filtering further comprising passing voxel values that exceed a predetermined minimum value; (c) voxel value filtering further comprising filtering each data subset to pass a predetermined percentage of the highest voxel values associated therewith; (d) voxel value filtering further comprising filtering each data subset to pass voxel values that exceed a calculated value computed on the basis of a range of values in the data subset; (e) stacking further comprising computing the cumulative sum of the filtered voxel values; (f) stacking further comprising computing the maximum value of the filtered voxel values; (g) stacking further comprising computing the average of the filtered voxel values; (h) having voxel values in SET spatial volumes correspond to semblance values; (i) acquiring the microseismic SET data set; (k) disposing at least some of the plurality of sensors along the surface of the earth; (l) disposing at least some of the plurality of sensors beneath the surface of the earth in a borehole or well bore; (m) selecting the data acquisition time period to range between about 1 minute and about one week; (n) acquiring the microseismic SET data set under ambient microseismic energy conditions; (o) selecting the skeletonization time period to correspond approximately to a time period over one of which hydraulic fracturing, casing perforation, string shot, and toe shot operations occur; (p) selecting the skeletonization time period to correspond approximately to a time period over one of which oil production is initiated and gas production is initiated; (q) selecting the skeletonization time period to correspond approximately to a time period over one of which oil production is occurring and gas production is occurring; (r) selecting the skeletonization time period to correspond approximately to a time period over one of which oil production is terminated and gas production is terminated; (s) selecting the skeletonization time period to correspond approximately to a time period over one of which oil production is reduced and gas production is reduced; (t) selecting the skeletonization time period to correspond approximately to a time period over which an ambient microseismic energy field is recorded; (u) voxel value filtering further comprising one of semblance filtering, median filtering, threshold filtering, 2-D filtering, 3-D filtering, coherence filtering, statistical filtering, deconvolution, random noise filtering, static and/or dynamic time shifting and correction, muting, and coherent noise rejection; (v) selecting the time window to range between about 0.1 seconds and about 1 hour; and (w) selecting the time increment to range between about 0.1 seconds and about one hour. Note that the time increment is generally less than or equal to the time window.

Figure 3:
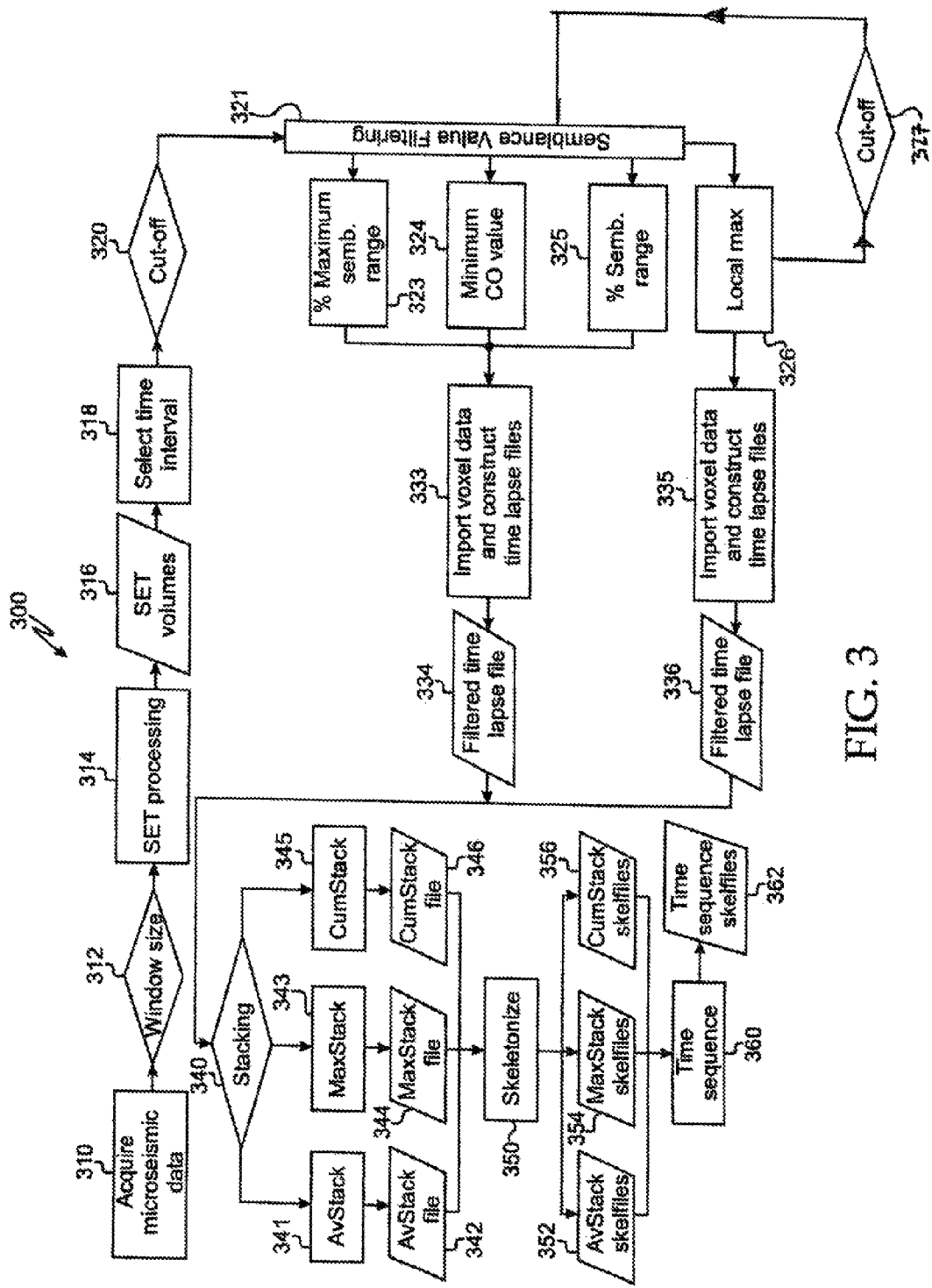
FIG. 3 shows another embodiment of a method 300 of processing microseismic data.

Referring now to FIG. 3, there is shown one embodiment of method 300, which is a variation of method 200 shown in FIG. 2, and which focuses on the use of semblance data processing techniques. As noted above, however, data filtering and processing techniques other than semblance data processing and filtering techniques may be employed in the various methods disclosed herein. Semblance generally refers to a measure of the similarity of two seismic traces, the quality of two wave trains, or waves consisting of several cycles, being in phase, the similarity of two mathematical functions as evaluated in the frequency domain, and/or a quantitative assessment of the similarity of three or more functions, also called semblance.

In FIG. 3, method 300 begins at step 310 where microseismic data are acquired over the data acquisition time period. At step 312, a window size for the acquired microseismic data is selected. By window size in step 312 we mean that: (a) a skeletonization time period is selected, which is shorter than the data acquisition time period, and (b) time windows for SET volumes are selected. By way of example, in a fracking operation, the skeletonization time period may range between several minutes and several hours, and in a casing perforation operation may range between several seconds and several minutes. Further by way of example, time windows for SET volumes typically range between about 0.1 seconds and several minutes depending on the particular application at hand. By way of yet further example, in fracking operations the time windows may range between about 10 seconds and several minutes, and in casing perforation operations the time windows may range between about 1 second and about 10 seconds. Additionally, the SET volumes (or "study volumes") may correspond, again by way of example only, to spatial volumes ranging between about 0.1 km$^3$ and about 5,000 km$^3$. Other values or ranges for the data acquisition time period, time windows, the skeletonization time period, SET volumes not explicitly set forth herein are of course contemplated.

Continuing to refer to FIG. 3, at step 314, and after the skeletonization time period and time windows have been selected, SET volumes corresponding to each of the time windows are generated, where each SET volume contains one or more voxels of microseismic data corresponding thereto. SET volume data files are produced at step 316 on the basis of step 314. At step 318 time intervals are selected, as discussed in some detail above. For example, if a skeletonization time period of one hour is selected at step 312, and time windows having a length of one minute each are selected at step 312, the time interval selected in step 318 might be 6 minutes so as to produce a total of ten time intervals corresponding to the one hour skeletonization time period. Each time interval of six minutes can then be used in subsequent processing steps to produce 10 skeletonization time sequence skelfiles displaying, for example, the progressive growth of the faults or fractures in formation 5 over time, more about which is said below.

Still referring to FIG. 3, at step 321 a decision is made as which cut-off filtering option from among steps 323, 324, 325 and 326 is to be employed in the next stage of processing (i.e., the percent of the number of voxels at step 323, minimum cut-off value at step 324, percent semblance range 325 at step 325, and local maximum at step 326). Note that trial and error in finding an optional one of the these cut-off filtering methodologies may be required.

Referring to step 324 in FIG. 3, according to one embodiment a method of voxel value filtering is to specify which percentage of the voxel values is selected. For example, if this criterion is set to select 10% of the voxels, then the voxels with the top 10% of the voxel values for a given SET spatial volume are passed through to the next step. The values of the attributes represented by the data set can vary considerably from one SET spatial volume to another, but this option ignores the variation and passes the specified percentage of voxels, which means that each SET spatial volume contributes the same number of voxels to the end result, but not necessarily at the same grid positions.

As further shown in step 324 in FIG. 3, another method of voxel value filtering is to generate a minimum voxel value. Only voxel values greater than this cut-off value are passed on to the next step. Different SET spatial volumes may contribute different numbers of voxels to the final result, depending on the range of voxel values within the SET spatial volume, and each SET spatial volume may contribute a different subset of voxels. Any SET spatial volume that does not have at least one value above the minimum value is not passed through to the following steps.

As also shown in FIG. 3 at step 325, another method of voxel filtering is to use a percentage of the range of values. First, for a given SET spatial volume the range of values from lowest to highest is determined. Then a percentage factor is applied to this range, so that the cut-off is set at some numerical value corresponding to that percentage of the range. For example, if the values vary between 0.1 and 0.5, the range is 0.4, and the selected percentage is 20%, then 20% of the range is 0.08. Only voxels with values exceeding (0.5-0.08) or 0.42 are passed through to the next step. Some SET spatial volumes have many voxels with high values, and some have very few, so the number of voxels contributed by each SET spatial volume can be expected to vary widely. The contributing voxels are not necessarily in the same grid position in the subsurface from one SET spatial volume to the next.

As additionally shown in FIG. 3 at step 326, another method of restricting the data to improve the quality of the final result is to use a local maximum algorithm. The previously described methods of voxel filtering may pass clusters of the highest values, at the expense of other significant but slightly lower values. For example, the top 10% of semblance values may all belong to one large release of seismic energy, but there may be other values corresponding to different events in the subsurface of the earth, which are omitted. In one embodiment of the local maximum algorithm, all voxels having a neighboring voxel with higher amplitude are discarded, leaving only isolated values representing the high point of each of multiple events. Only these isolated values are passed through to the next step. Other embodiments using different algorithms to define local maximum values will become apparent to those skilled in the art. In an additional embodiment, after the local maximum algorithm has been applied, the results are filtered using a cut-off filtering option from among steps 323, 324, 325, (i.e., the percent of the number of voxels at step 323, minimum cut-off value at step 324, percent semblance range at step 325). The processing parameters used in this additional filtering step are computed from the values contained within the local maximum algorithm output data.

A further method of conditioning data by excluding certain data points is to specify an upper boundary for the voxel values. This technique may be used to modify anomalous or highly skewed data where the results might otherwise be distorted by a small number of values with amplitudes greatly exceeding the norm. This technique may be used alone or in conjunction with the previously described techniques for limiting the data values passed to the next step.

Continuing to refer to FIG. 3, once the appropriate cut-off filtering option has been selected at step 321, and the selected semblance filtering option has been carried out, voxel file data are imported at step 333 or step 335 into a time lapse file, and a filtered time lapse file is created at step 334 or step 336. The filtered time lapse file is then forwarded to stacking step 340, where a decision is made as to which of stacking methodologies 341 (average stack or "AvStack"), 343 (maximum stack or "MaxStack") or 345 (cumulative stack or "CumStack") is to be employed.

The stacking methodology 341 (average stack or "AvStack") is further described below in the discussion regarding FIGS. 10 and 11. Stacking methodology 343 (maximum stack or "MaxStack") is further described below in connection with FIGS. 8 and 9. Stacking methodology 345 (cumulative stack or "CumStack") is further described below in the discussion regarding FIGS. 6 and 7.

Continuing to refer to FIG. 3, steps 341, 343, and 345 are followed by generating one of average stack (AvStack) data files at step 342, maximum stacking (MaxStack) data files at step 344, or cumulative stack (CumStack) data files at step 346, depending on the type of stacking that has been selected after stacking step 340, and the output data file is forwarded to step 350, where the file is "skeletonized."

One method of skeletonization using a thinning algorithm is described in Directional 3D Thinning Using 8 Subiterations, Kálmán Palágyi and Attila Kuba, DGCI'99, LNCS 1568, 325-336 (1999), the disclosure of which is incorporated herein in its entirety. Illustrations of a simple form of skeletonization are shown in "Direct Mapping of Reservoir Permeability Fields", Peter Geiser, Jan Vermilye, Rob Scammell and Steve Roecker, Oil & Gas Journal, December 2006 the disclosure of which is incorporated herein in its entirety. This article discloses 2-D skeletonization slices taken through a 3-D SET volume. Some aspects of the teachings of these references may be adapted and modified for use in the skeletonization process at step 350 of FIG. 3. Further detail and descriptions of some embodiments of such skeletonization techniques are further described below.

The skeletonized data from step 350 are next employed to generate one of an AvStack skelfile at step 352, a MaxStack skelfile at step 354, or a CumStack skelfile at step 356. The appropriate skelfile output corresponding to the single given time interval is then taken at step 360 and placed in its appropriate location in a time sequence, followed at step 362 by being placed within a sequence of other previously or subsequently calculated skelfiles to create a graphical sequence of 3-D skeletonization images that reveal the progress of the faults or fractures generated by the well procedure or subsurface event that has been monitored (e.g., fracking or perforation). In another embodiment the sequence of skelfiles may be combined into one display with the data values color coded based on the time stamp associated with the time interval associated with each of the sequence of skelfiles.

Figure 5:
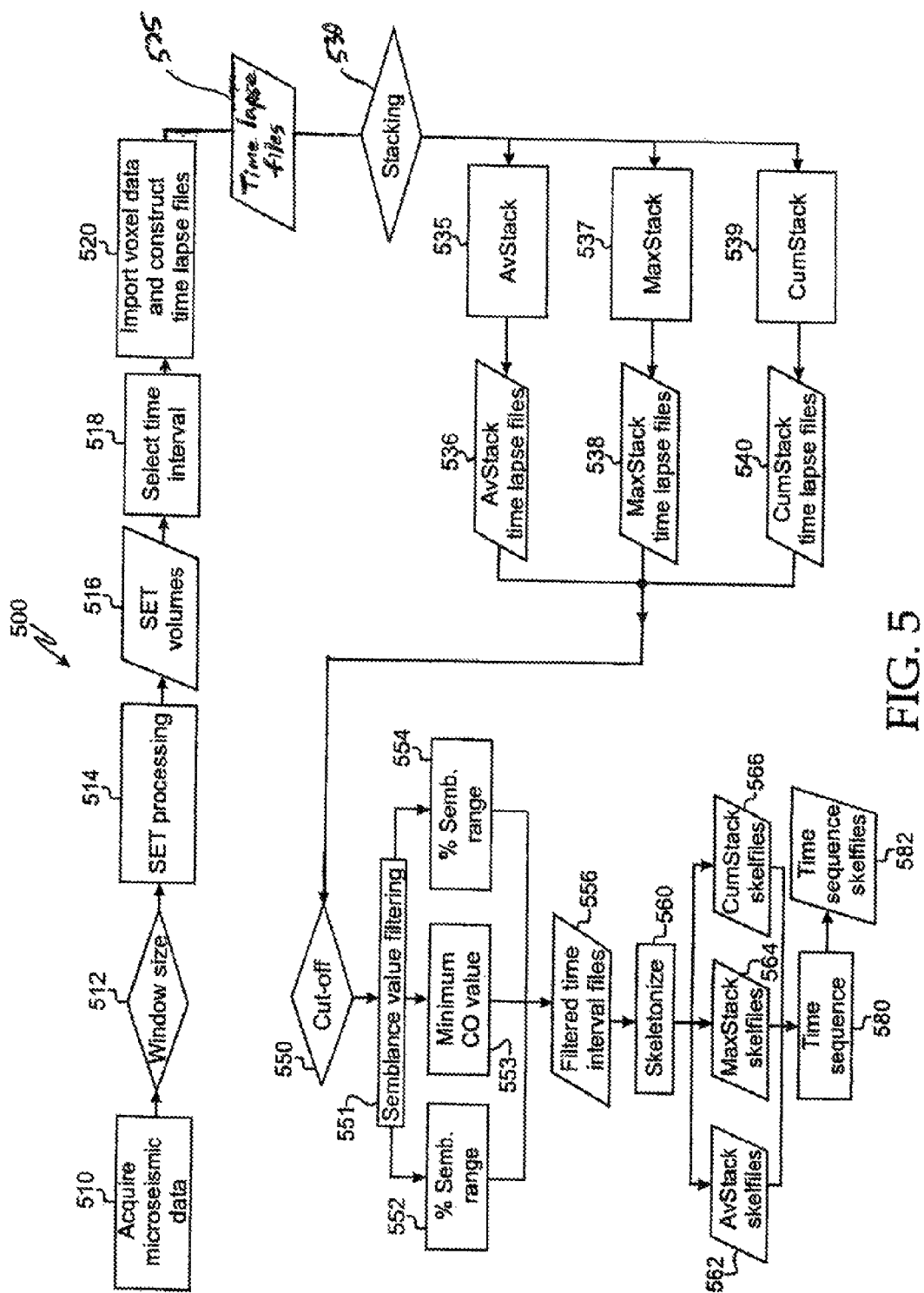
FIG. 5 shows still another embodiment of a method 500 of processing microseismic data.

Each one of the SET spatial volumes, or windows, represents a snapshot in time of the energy being emitted from the fractures or faults within a volume of the subsurface. One objective of this method is to show the growth of a fracture, or the movement of a fault, as it develops over time. This is done by taking more than one of the SET spatial volumes and stacking the values at corresponding voxels to produce one SET spatial volume representing an attribute of the seismic energy released over the total time of the combined windows. Each member of the series of the more than one of the SET spatial volumes has an assigned time stamp marking the time when the data in the volume was recorded. The series of the more than one of the SET spatial volumes ordered by the assigned time stamp is shown in FIG. 3 and FIG. 5 and is referred to as a 'time lapse volume'. The time lapse volume may cover the entire skeletonization time period, or the skeletonization time period may be divided into a plurality of time lapse volumes which are stacked individually and the results displayed as a time sequence showing the growth of the fractures. The techniques described herein for accomplishing this stacking process are examples of possible embodiments, and many other techniques will become apparent to those skilled in the art upon having read and understood the present disclosure.

Figure 4:
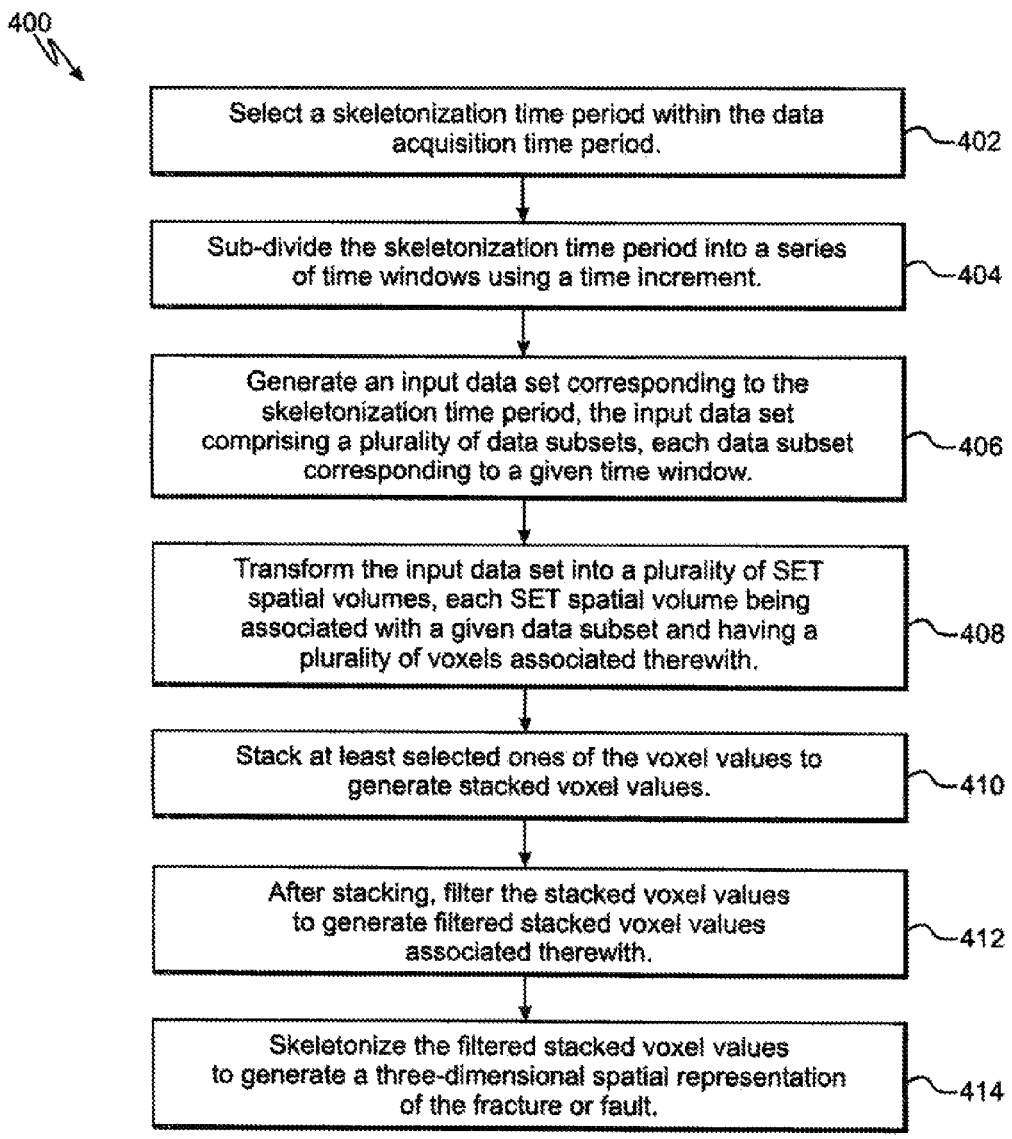
FIG. 4 shows yet another embodiment of a method 400 of processing microseismic data.

Referring now to FIG. 4, there is shown one embodiment of another method 400 for imaging one of a fracture and a fault in an earth volume disposed beneath a surface of the earth using a microseismic seismic emission tomography (SET) data set acquired over a data acquisition time period using a plurality of sensors located at a plurality of sensor positions disposed proximate the earth volume. As shown in FIG. 4, at step 402 a skeletonization time period within the data acquisition time period is selected. At step 404 the skeletonization time period is sub-divided into a series of time windows using a time increment. At step 406 an input data set corresponding to the skeletonization time period is generated, where the input data set comprises a plurality of data subsets, each data subset corresponding to a given time window. At step 408 the input data set is transformed into a plurality of SET spatial volumes, where each SET spatial volume is associated with a given data subset and has a plurality of voxels associated therewith. Next, at step 410 selected ones of the voxel values are stacked to generate stacked voxel values. After stacking, at step 412, the stacked voxel values are used to generate filtered stacked voxel values associated therewith. Finally, at step 414 the filtered stacked voxel values are skeletonized to generate a three-dimensional spatial representation of the fracture or fault. Some additional steps that may be included in some embodiments of method 400 of FIG. 4 include, but are not limited to, those described above with respect to FIG. 2.

Referring now to FIG. 5, there is shown one embodiment of method 500 corresponding to method 400 of FIG. 4, where method 500 shows further details concerning some of the steps of method 400 according to one embodiment. In FIG. 5, method 500 begins at step 510 where microseismic data are acquired. At step 512, a window size for the acquired microseismic data is selected. By window size in FIG. 5 we mean a skeletonization time period is selected, which is shorter than the data acquisition time period, and time windows for SET volumes are selected. By way of example, in a fracking operation, the skeletonization time period may range between several minutes and several hours, and in a casing perforation operation may range between several seconds and several minutes. Further by way of example, time windows for SET volumes typically range between about 0.1 seconds and several minutes depending on the particular application at hand. By way of yet further example, in fracking operations the time windows may range between about 10 seconds and several minutes, and in casing perforation operations the time windows may range between about 1 second and about 10 seconds. Additionally, the SET volumes (or "study volumes") may correspond, again by way of example only, to spatial volumes ranging between about 0.1 km³ and about 5,000 km³. Other values or ranges for the data acquisition time period, time windows, the skeletonization time period, SET volumes not explicitly set forth herein are of course contemplated.

Continuing to refer to FIG. 5, at step 514, and after the skeletonization time period and time windows have been selected, SET volumes corresponding to each of the time windows are generated, where each SET volume contains one or more voxels of microseismic data corresponding thereto. SET volume data files are produced at step 516 on the basis of step 514. At step 518 time intervals are selected, as discussed in some detail above. For example, if a skeletonization time period of one hour is selected at step 512, and time windows having a length of one minute each are selected at step 512, the time as interval selected in step 518 might be 6 minutes so as to produce a total of ten time intervals corresponding to the one hour skeletonization time period. Each time interval of six minutes can then be used in subsequent processing steps to produce 10 skeletonization time sequence skelfiles displaying, for example, the progressive growth of the faults or fractures in formation 5 over time, more about which is said below.

At step 520, voxel data time lapse files are created and the voxel file data imported into the voxel data time lapse files. A time lapse file contains the SET processed voxel data for the subset of time windows contained within a time interval.

Still referring to FIG. 5, at step 530, a stacking option is selected, which according to one embodiment may include one or more of average stacking (AvStack), maximum stacking (MaxStack), and cumulative stacking (CumStack) steps 535, 537 and 539, respectively. The stacking methodology 535 (average stack or "AvStack") is further described below in the discussion of FIG. 10 and FIG. 11. The stacking methodology 537 (maximum stack or "MaxStack") is further described below in the discussion of FIG. 8 and FIG. 9. The stacking methodology 539 (cumulative stack or "CumStack") is further described below in the discussion of FIG. 6 and FIG. 7.

Steps 535, 537, and 539 generate, respectively, one of average stack (AvStack) time lapse files at step 535, maximum stacking (MaxStack) time lapse files at step 537, or cumulative stack (CumStack) time lapse files at step 540, depending on the type of stacking that has been selected after at stacking option selection step 530.

The output time lapse files from steps 535, 537 or 539 are provided to step 550, where the values are next directed to one semblance value filtering steps percent semblance range 552, minimum CO value step 553 and percent of voxels 554.

Referring to step 554 in FIG. 5, according to one embodiment a method of voxel value filtering is to specify what percentage of the voxel values will be chosen. For example, if this criterion is set to select 10% of the voxels, then the voxels with the top 10% of the voxel values for a given SET spatial volume will be passed through to the next step. The values of the attributes represented by the data set can vary considerably from one SET spatial volume to another, but this option ignores the variation and passes the specified percentage of voxels, which means that each SET spatial volume will contribute the same number of voxels to the end result, but not necessarily at the same grid positions.

As further shown in step 553 in FIG. 5, another method of voxel value filtering is to generate a minimum voxel value. Only voxel values greater than this cut-off value are passed on to the next step. Different SET spatial volumes may contribute different numbers of voxels to the final result, depending on the range of voxel values within the SET spatial volume, and each SET spatial volume may contribute a different subset of voxels. Any SET spatial volume which does not have at least one value above the minimum value will not be passed through to the following steps.

As also shown in FIG. 5 at step 552, another method of voxel filtering is to use a percentage of the range of values. First, for a given SET spatial volume the range of values from lowest to highest is determined. Then a percentage factor is applied to this range, so that the cut-off is set at some numerical value corresponding to that percentage of the range. For example, if the values vary between 0.1 and 0.5, the range is 0.4, and the selected percentage is 20%, then 20% of the range is 0.08. Only voxels with values exceeding (0.5-0.08) or 0.42 will be passed through to the next step. Some SET spatial volume will have many voxels with high values, some will have very few, so the number of voxels contributed by each SET spatial volume will vary widely. The contributing voxels will not necessarily be in the same grid position in the subsurface from one SET spatial volume to the next.

Filtered time interval files 556 are output from the filtering process selected at 550. At this point in the data processing flow, time sequences are generated at step 580, and the skeletonization process 560 generates time sequence skeletonization files at step 562 (Avstack skelfile), 564 (Maxstack skelfile) or 566 (CumStack skelfile) depending on which methodology was selected in the stacking process at 530. whereupon a 3-D representation of the skeletonized fracture or fault is finally produced.

One method of generating the time sequence skeletonization files, using a thinning algorithm, is described in Directional 3D Thinning Using 8 Subiterations, Kálmán Palágyi and Attila Kuba, DGCI'99, LNCS 1568, 325-336 (1999), the disclosure of which is incorporated herein in its entirety. Illustrations of a simple form of skeletonization are shown in "Direct Mapping of Reservoir Permeability Fields", Peter Geiser, Jan Vermilye, Rob Scammell and Steve Roecker, Oil & Gas Journal, December 2006 the disclosure of which is incorporated herein in its entirety. Some aspects of these references may be applied to the skeletonization process of FIG. 5 at 560. Further detail and descriptions of some embodiments of the skeletonization step are described below.

The skeletonized data from step 560 are next employed to generate one of an AvStack skelfile at step 562, a MaxStack skelfile at step 564, or a CumStack skelfile at step 566. The appropriate skelfile output corresponding to the single given time interval is then taken at step 580 and placed in its appropriate location in a time sequence, followed at step 582 by being placed within a sequence of other previously or subsequently calculated skelfiles to create a graphical sequence of 3-D skeletonization images that reveal the progress of the faults or fractures generated by the well procedure or subsurface event that has been monitored (e.g., fracking or perforation). In another embodiment the sequence of skelfiles may be combined into one display with the data values color coded based on the time stamp associated with the time interval associated with each of the sequence of skelfiles.

Figure 6:
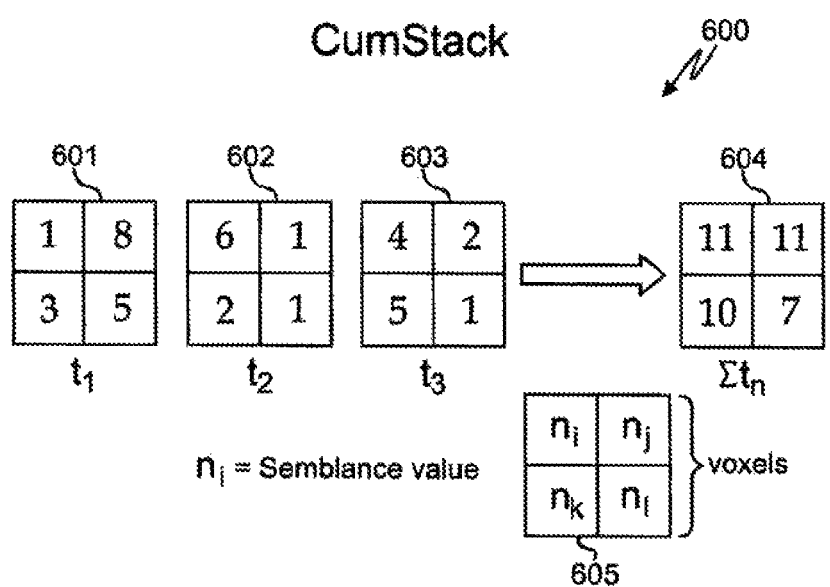
FIG. 6 shows one embodiment of selecting semblance values for voxels according to a cumulative stacking process.

FIG. 6 shows one embodiment in which the voxel values are stacked using a simple cumulative sum. For each voxel, the values corresponding to such voxel for each window 601, 602, 603 are added together to produce a sum of the values in the output SET spatial volume 604. In such an embodiment, the voxel values represent semblance, but other attribute values may be selected. This embodiment works best with data attributes having only positive values, such as semblance or reflection strength, but is generally not suitable for data attributes with both positive and negative values, such as amplitude, because these attributes may sum destructively due to phase and time shifts in how the seismic energy is recorded at each voxel.

Figure 7:
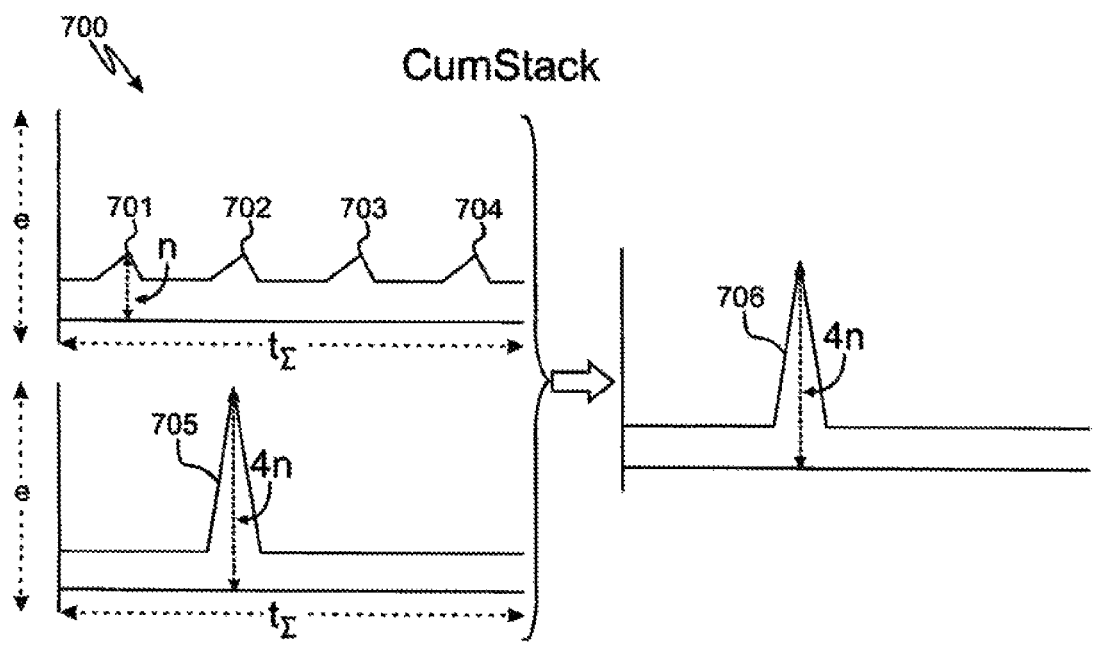
FIG. 7 shows further details corresponding to FIG. 6 of generating cumulative stacking values.

FIG. 7 shows such an embodiment cannot distinguish between a large output value 706 resulting from one single large event 705 and a large output value resulting from a longer period of relatively weaker activity, with lower amplitude events 701, 702, 703.

Figure 8:
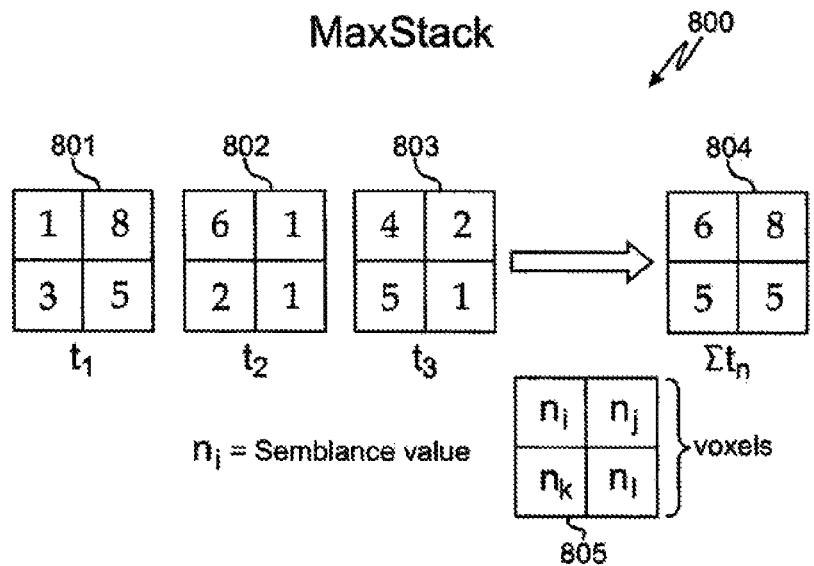
FIG. 8 shows one embodiment of selecting semblance values for voxels according to a maximum stacking process.

FIG. 8 illustrates another embodiment of the stacking process, in which the output SET spatial volume 804 is created by selecting for each voxel only the maximum value present at that voxel in any of the input data subsets 801, 802, 803.

Figure 9:
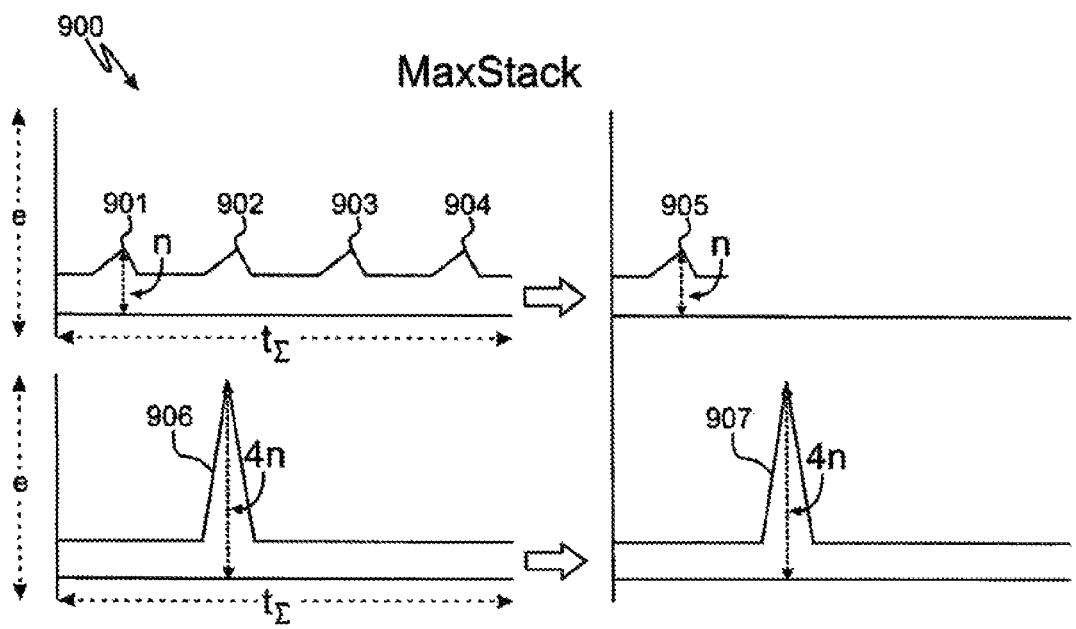
FIG. 9 shows further details corresponding to FIG. 8 of generating maximum stacking values.

As further shown in FIG. 9, such an embodiment does distinguish event sizes, but at the cost of losing information about the persistence of activity. For this reason it may be used in conjunction with the cumulative stack described above. A voxel with persistent but low values 901, 902, 903, 904 may show a higher value in the cumulative stack 706 than it would in the maximum stack 905, whereas a voxel with a smaller number of larger values would show high values 706, 907, in both types of stack.

Figure 10:
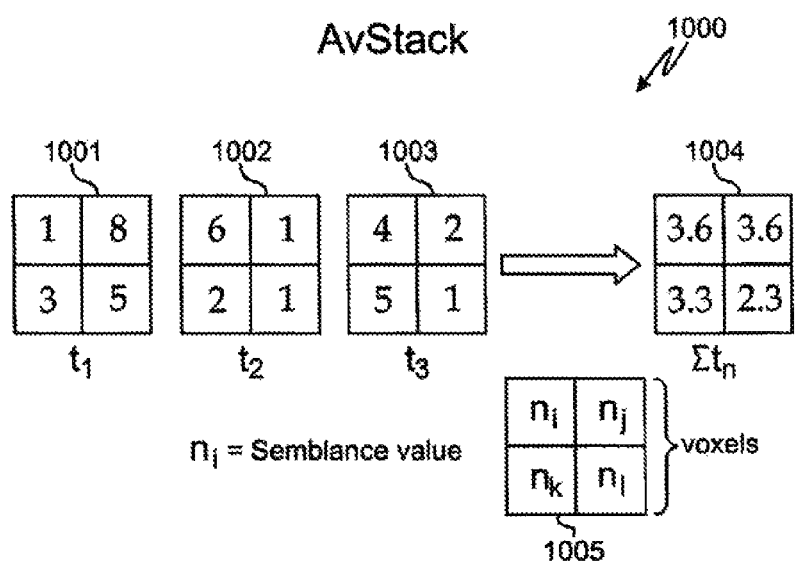
FIG. 10 shows one embodiment of selecting semblance values for voxels according to a average stacking process.
Figure 11:
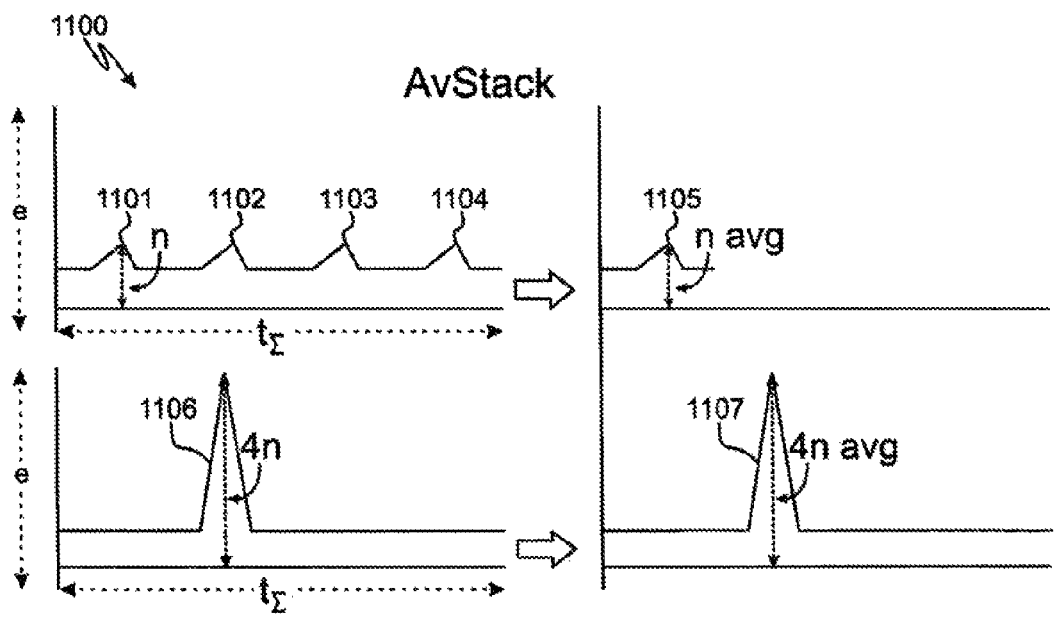
FIG. 11 shows further details corresponding to FIG. 10 of generating average stacking values.

FIG. 10 shows a further embodiment, in which the voxel values are summed at each voxel position, and the sum is divided by the number of values contributing to the sum at that voxel position to generate an average value stack. If the input data have been conditioned using voxel value filtering or a similar algorithm as described above, then the number of values contributing to the sum at each voxel may be different, and will be equal to or less than the number of SET spatial volumes contributing to the stack. This is illustrated in FIG. 11, which shows a voxel position with four small values n at different times 1101, 1102, 1103, 1104, producing an average value of n 1105, contrasted with a voxel position with only one contributing voxel of magnitude 4n 1106, producing an average value of 4n 1107. The cumulative stack also would show an output value of 4n 706 at this voxel position.

The embodiments of stacking techniques described above are not mutually exclusive and may be used in combination to extract more useful information from the data. For example, the ratio of the maximum stack to the average stack can be used as a quantitative indicator of the relative strengths of the fault and fracture zones.

As shown in FIG. 2 and FIG. 3, in one embodiment, filtering may be performed before the stacking. As shown in FIG. 4 and FIG. 5, and in another embodiment, the stacking may be performed before filtering. Any combination of the previously described filtering and stacking techniques, and other filtering and stacking techniques which will be apparent to one skilled in the art, may be used.

The output from the filtering and stacking, or stacking and filtering, processes is an SET spatial volume representing the skeletonization time period. The data in this SET spatial volume is then input to the skeletonization process. The goal of the skeletonization process is create an image of the fracture or fault zones.

One basis for the above-described techniques is the observation that over a period of time the locations of highest semblance values, which are interpreted as a measure of seismic energy release, are geographically stable. This is consistent with empirical data showing that crack density increases logarithmically as the surface of the discontinuity is approached. See, for example, "The process zone: A microstructural view of fault growth", Jan M. Vermilye and Christopher H. Scholz, Journal of Geophysical Research, 1998, Vol. 103, No B6, pp 12,223-12,237, the disclosure of which is incorporated by reference herein in its entirety. Thus as regions of higher crack density, fracture and/or fault zones should be expressed as geographically stable zones of relatively high seismic energy release. Seismic energy $E_s$ emitted by crack failure may be expressed as $$E_s \cong \tfrac{1}{2} \Delta\delta \Delta\tilde{u} A$$

where $\Delta\delta$=deviatoric stress; $\Delta\tilde{u}$=Slip on fracture/fault surface; A=Area of slip surface. Thus, the same amount of seismic energy can be the product of either a single slip surface or of many slip surfaces whose total area is equal to that of the single slip surface.

The skeletonization process provides a means of extracting a more coherent signal from the "fuzzy" data cloud. The skeletonization process is based on an empirically derived equation (Vermilye and Scholz, 1998) based on field observation and measurement, relating crack density to the location of the fracture/fault discontinuity. This equation has the following form:

$$\rho = M(\ln [d]) + B$$

where $\rho$=density; d=distance from the zone discontinuity, and M and B are constants.

Skeletonization of data is a method applied to a body of 2D or 3D data points, which are typically distributed throughout a 2D or 3D uniform grid, to extract out a subset of points of the data, variously called the "skeleton" or "topological skeleton" or the "medial surface" or the "medial axes" or the "medial subset" or the "thinned" subset of the body of data points, which points satisfy certain criteria as being those points inside the body of data points which are "equidistant" from the "boundaries" of the body of data points. The locations of the volume not in the skeleton are assigned a special value, for example, 0, to indicate that there is no data at that location. The skeleton may share certain properties with the original body of data points such topological properties (same number of disjoint pieces, same number of holes, for example.)

Several different algorithms may be employed to extract the skeleton, including "thinning" and "level sets" and "marching squares and marching cubes" methods, described below. Other algorithms include morphological operators, curve evolution, determining the ridge points of a distance function, and shape peeling without changing the topology, until convergence has been achieved.

In one embodiment in which thinning algorithms are employed, a definition of "boundary" or "border" points of the body of data points is established and the boundary points are removed, layer by layer, through successive iterations, eventually leaving just the skeleton points of the body of data points. For further references see "Directional 3D Thinning Using 8 Subiterations", Kálmán Palágyi and Attila Kuba. DGCI'99, LNCS 1568, 325-336 (1999) hereby incorporated by reference herein in its entirety.

In another embodiment using level set algorithms, a function is defined which computes a distance D(p) from points p in the data volume to the boundary of the body of data points. The level sets are the isolines (or contours) of the function D (lines consisting of points p which are a constant distance D0=D(p) from the boundary) or isosurfaces in the 3D case. The skeleton consists of all those locations lying on an isoline (or isosurfaces) at which the isoline direction (a direction tangent to the isoline or isosurface) changes abruptly (discontinuously). In the continuous case, these are singularities in the normal vector to the isoline or isosurfaces. Level set algorithms are designed to detect these singularities. The numerous approaches to the digital case dealing with the inherent instability of continuous approximation to discrete data may involve preprocessing smoothing operations, grid refinement operations, defining a suitable distance function D(p) and then applying a level set method such as the fast marching methods or singularity detection. For further information see "A Continuous Skeletonization Method Based on Level Sets", by Martin Rumpf, Alexandru Telea, Joint EUROGRAPHICS—IEEE TCVG Symposium on Visualization, 2002, which is hereby incorporated by reference herein in its entirety.

In a further embodiment, a marching cubes method is employed, which is a standard method of generating computer graphics having numerous algorithmic implementations, including a marching tetrahedrons variation, which start from the boundary of the body of data points and successively removes the points of the outer layers (isosurfaces), thereby mimicking the fire front of an irregular field of grasses whose boundaries are is simultaneously set on fire and in which the burn moves inwardly at a constant rate perpendicular to the respective boundaries until the fire collapses on itself at the "shock" points. The shock points, which correspond to the singularities of the level set methods, then constitute the skeleton of the data set. For further information see J. A. Sethian, "Level Set Methods and Fast Marching Methods", Cambridge University Press, 1999, not incorporated herein by reference, and William E. Lorensen, Harvey E. Cline: "Marching Cubes: A high resolution 3D surface construction algorithm", Siggraph 87 Proceedings, ser Computer Graphics, Vol 21, Nr. 4, 163-170 July 1987, hereby incorporated by reference herein in its entirety.

The output of the skeletonization process is one or more skeletonized data volumes representing the entire skeletonization time period, or subsets of such time period corresponding to the previously defined time lapse volumes. This output may be displayed on a computer screen as a 3D representation, or as a 3D representation which varies with time, and may be shown as a succession of images. The results may also be displayed as time or spatial slices through the data. This enables one to see the results of injecting the fracturing fluid into formation 5 in near real-time, and may be employed to modify the parameters of the fracturing operation as necessary.

Further processing algorithms may be applied to the skeletonization output, to remove anomalous results. In one embodiment, other attributes of the original may be computed and displayed at the locations defined by the skeleton. The results of the skeletonization process may be output for use in other geophysical and geological data analysis software.

Moreover, some of the embodiments described herein are capable of illuminating or imaging not only fractures or faults produced by fracking, but also of illuminating imaging systems of pre-existing fracture or fault networks occurring in the subsurface.

The various methods of fracture or fault imaging described above may include acquiring or recording the ambient microseismic energy field before any well or other subsurface operations are undertaken, such as fracking, perforation, increasing, decreasing, initiating, or terminating gas and/or oil production. By recording the ambient microseismic energy field before after a well operation is initiated, a seismic background bench mark can be generated against which the perturbed seismic field may be compared. According to one embodiment, the ambient microseismic field is recorded for a period of several hours, although other appropriate periods of time may also be employed as those skilled in the art will now understand. The ambient microseismic field may also be recorded after a well operation has been carried out.

The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

We claim:

1. A method of imaging the growth of a fracture or fault network in a volume of the earth's subsurface in the vicinity of a well bore resulting from the injection of hydraulic fracturing fluid through said well bore into said volume of the earth's subsurface, comprising:
    selecting a portion of a microseismic data set recorded continuously during a data acquisition time period in which hydraulic fracturing fluid is injected through said well bore into said volume of the earth's subsurface, using a plurality of sensors positioned proximate said volume of the earth's subsurface, said microseismic data set representing microseismic emissions from faults or fractures resulting from said injection of hydraulic fracturing fluid;
    subdividing said continuously recorded microseismic data set into a plurality of time windows;
    processing said selected portion of said continuously recorded microseismic data set within a plurality of said time windows to generate three dimensional spatial representations of fractures or faults in said volume of the earth's subsurface resulting from injection of hydraulic fracturing fluid through said well bore into said volume of the earth's subsurface; and
    generating a time lapse display of selected ones of said three dimensional spatial representations of fractures or faults to show the growth of a fracture or fault network resulting from said injection of hydraulic fracturing fluid through said well bore into said volume of the earth's subsurface.

2. The method of claim 1, wherein generating a time lapse display of selected ones of said three dimensional spatial representations comprises creating a graphical sequence of images of said spatial representations that reveal the progress of faults or fractures.

3. The method of claim 1, wherein generating a time lapse display of selected ones of said three dimensional spatial representations comprises combining a sequence of said spatial representations into a display with data values color coded based on the time interval associated with each of the spatial representations.

4. The method of claim 1, wherein generating a time lapse display of selected ones of said three dimensional spatial representations comprises displaying a succession of images of said spatial representations on a computer screen.

5. The method of claim 1, wherein the selected time period ranges between about 0.1 seconds and about 1 hour.

6. The method of claim 1 wherein processing said selected portion of a microseismic data set comprises:
    generating a plurality of data subsets, each data subset corresponding to a time window;
    transforming said data subsets into voxel values representing microseismic emissions from a three-dimensional grid of voxels in said volume of the earth's subsurface;
    voxel value filtering data subsets to generate filtered voxel values and stacking filtered voxel values from at least a plurality of said time windows within said selected time period to generate stacked, filtered voxel values for said time windows; and
    skeletonizing said filtered stacked filtered voxel values from a plurality of said selected time windows to generate skeletonized spatial representations of said volume of the Earth's subsurface during successive selected time windows;
    wherein said time lapse display is a display of a skeletonized representation of the growths of a fracture or fault network over time.

7. The method of claim 6, wherein voxel value filtering further comprises computing at least one local maximum in the voxels of the data subset.

8. The method of claim 6, wherein voxel value filtering further comprises passing voxel values that exceed a predetermined minimum value.

9. The method of claim 6, wherein voxel value filtering further comprises filtering each data subset to pass a predetermined percentage of the highest voxel values associated therewith.

10. The method of claim 6, wherein voxel value filtering further comprises filtering each data subset to pass voxel values that exceed a calculated value computed on the basis of a range of values in the data subset.

11. The method of claim 6, wherein stacking further comprises computing the cumulative sum of the filtered voxel values.

12. The method of claim 6, wherein stacking further comprises computing the maximum value of the filtered voxel values.

13. The method of claim 6, wherein stacking further comprises computing the average of the filtered voxel values.

14. The method of claim 6, wherein the voxel value data correspond to semblance values.

15. The method of claim 6, wherein voxel value filtering further comprises one of semblance filtering, median filtering, threshold filtering, 2-D filtering, 3-D filtering, coherence filtering, statistical filtering, deconvolution, random noise filtering, static and/or dynamic time shifting and correction, muting, and coherent noise rejection.

16. The method of claim 1, further comprising acquiring the microseismic data set.

17. The method of claim 16, further comprising disposing at least some of the plurality of sensors along the surface of the earth.

18. The method of claim 16, further comprising disposing at least some of the plurality of sensors beneath the surface of the earth in a borehole.

19. The method of claim 16, wherein the microseismic data set is acquired during a data acquisition time period that ranges between about 1 minute and about one week.

* * * * *